US005659905A

United States Patent [19]

Palmer, Jr. et al.

[11] Patent Number: 5,659,905

[45] Date of Patent: Aug. 26, 1997

[54] PATIENT TRANSFER/TURNING BED

[76] Inventors: John M. Palmer, Jr., P.O. Box 115, Lutz, Fla. 33549; John M. Palmer, III, P.O. Box 823291, Dallas, Tex. 75382

[21] Appl. No.: 596,766

[22] Filed: Feb. 5, 1996

Related U.S. Application Data

[63] Continuation of Ser. No. 280,714, Jul. 26, 1994, abandoned.

[51] Int. Cl.[6] .................................................. A61C 7/06

[52] U.S. Cl. .............................. 5/88.1; 5/612; 5/81.1 R

[58] Field of Search ........................ 5/600, 612, 81.1 R, 5/87.1, 88.1, 89.1, 488

[56] References Cited

U.S. PATENT DOCUMENTS

| | | | |
|---|---|---|---|
| 658,217 | 9/1900 | Munger | 5/88.1 |
| 852,280 | 4/1907 | Mason | 5/88.1 |
| 943,003 | 12/1909 | Cleaves | 5/88.1 |
| 1,487,150 | 3/1924 | Deakins | 5/88.1 |
| 1,934,302 | 11/1933 | Greenwood | 5/88.1 |
| 3,108,290 | 10/1963 | Partridge | 5/88.1 |
| 3,593,351 | 7/1971 | Dove | 5/81.1 |
| 3,924,281 | 12/1975 | Gibbs | 5/88.1 |
| 4,502,169 | 3/1985 | Persson | 5/88.1 |
| 4,843,665 | 7/1989 | Cockel et al. | 5/88.1 |
| 5,168,587 | 12/1992 | Shutes | 5/81.1 |
| 5,274,862 | 1/1994 | Palmer, Jr. et al. | 5/81.1 |

FOREIGN PATENT DOCUMENTS

| | | | |
|---|---|---|---|
| 293819 | 8/1916 | Germany | 5/88.1 |
| 2410414 | 9/1976 | Germany | 5/612 |
| 3438956 | 5/1985 | Germany | 5/612 |

*Primary Examiner*—Michael F. Trettel

[57] ABSTRACT

Embodiment (14) of the present invention has powered rotating drive rollers (44, 46) on each side of the bed's mattress (30). The drive rollers are connected to articulating arms (56) which pivot about axis (58, 59) near the center of the head end (21) and the foot end (22) of the bed. A transfer/turning sheet (66) removably connects to the drive rollers. By raising the drive roller on one side of the bed a patient (80) will be rolled over toward the opposite side. That drive rolled will then be lowered and the transfer/turning sheet will lay flat on the mattress again. The patient can be transferred laterally (47) across the bed by turning the drive rollers.

20 Claims, 6 Drawing Sheets

PATIENT TRANSFER/TURNING BED

RELATED U.S. APPLICATION DATA

This is a continuation of patent application Ser. No. 08/280,714 filed on Jul. 26, 1994, now abandoned.

BACKGROUND—FIELD OF INVENTION

This invention relates to equipment used in homes, nursing homes, retirement homes, hospitals, and other private and public places for turning over elderly and disabled patients and moving them across the surface of their beds.

BACKGROUND—DESCRIPTION OF PRIOR ART

Moving a patient across a bed and turning the patient over has been a chore causing injuries to many caregivers. Quite often elderly patients develop decubitus ulcers as a result of not being turned over or repositioned as often as necessary. For many years the primary device useful in moving a patient across a bed has been a "draw sheet". Even with this device several caregivers may be required to move a heavy patient across a bed. Recent inventions preclude the use of a "draw sheet" in favor of slings and other body engaging means for moving a patient.

Shutes, U.S. Pat. No. 5,168,587 shows a turning/transfer device that must be fitted around the patient. That portion of the patient's body not in the device must be dragged across the bed during its use. Precise control of the mining process will be difficult to maintain and extended wear of the device will be uncomfortable.

This inventor's, U.S. Pat. No. 5,274,862 show a device that rolls a patient over and also relocates the patient to a certain degree. However, as in Shutes the device must be worn by the patient.

OBJECTS AND ADVANTAGES

Accordingly, objects and advantages of the present invention are:

(a) to provide a device that will pull a "draw sheet" in a manner similar to that a caregiver would use;

(b) to provide a device that will lift a "draw sheet" and a patient above the bed so that a bath tub or bed pan can be placed between the patient and the mattress;

(c) to provide a device that can be operated by the patient in many cases;

(d) to provide a device that does not have to be worn by the patient;

(f) to provide a device that manages a top sheet and blankets;

(g) to provide a device that can be programmed to transfer, lift, turn a patient over, and change the vertical positions of an adjustable bed automatically.

Further objects and advantages are to provide a device that can be economically manufactured and distributed. Still further objects and advantages will become apparent from a consideration of the ensuing description and drawings.

DRAWING FIGURES

In the drawings, closely related figures have the same number but different alphabetic suffixes:

Figure 1:
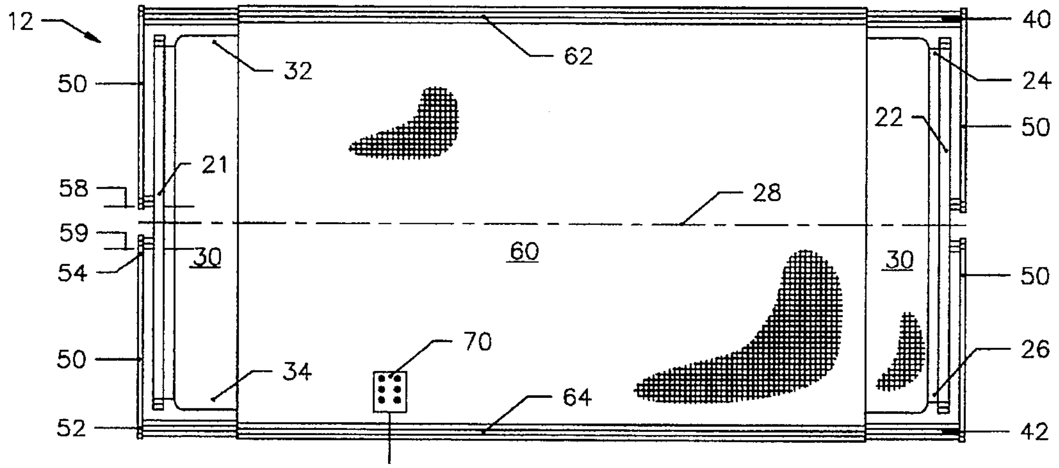
FIG. 1 is a plan view of a turning only embodiment of this invention.
Figure 2:
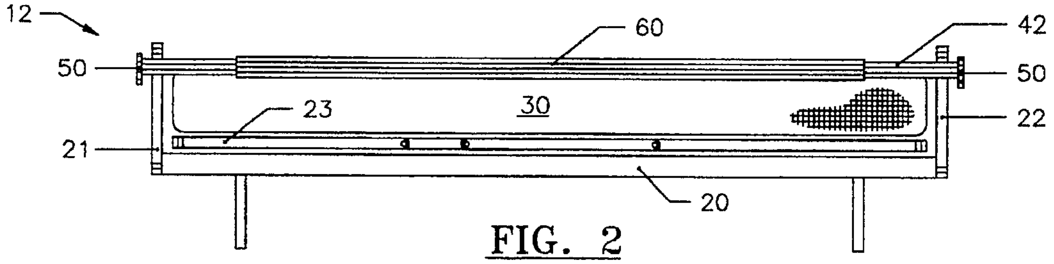
FIG. 2 is a side elevation view of that of FIG. 1.

FIG. 5 thru FIG. 8 are end elevation views of the device of FIG. 1 and FIG. 2 with the foot board and mechanical equipment not shown.

Figure 3:
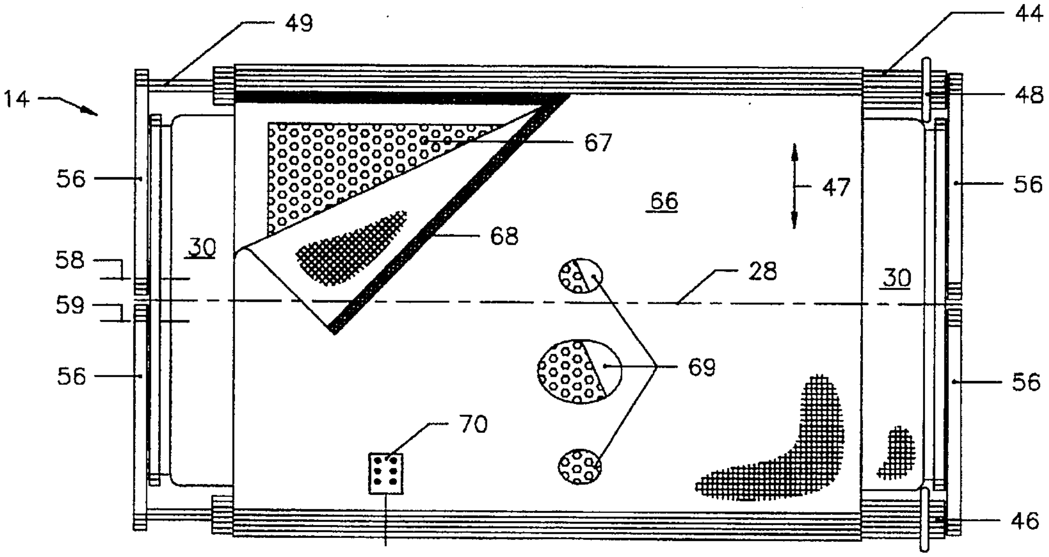
FIG. 3 is a plan view of a turning and a lateral transferring embodiment of this invention.
Figure 4:
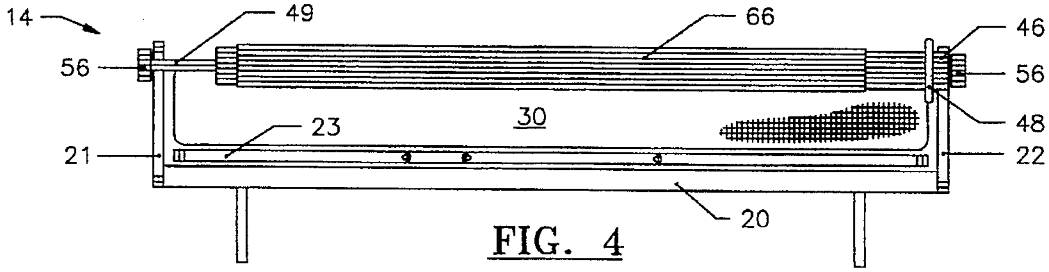
FIG. 4 is an side elevation view of that of FIG. 3.
Figure 5:
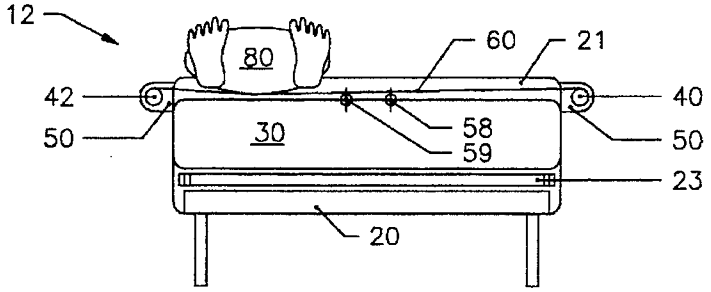
Figure 6:
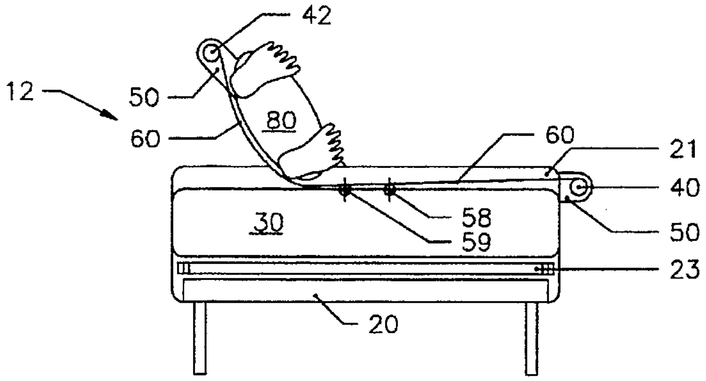
Figure 7:
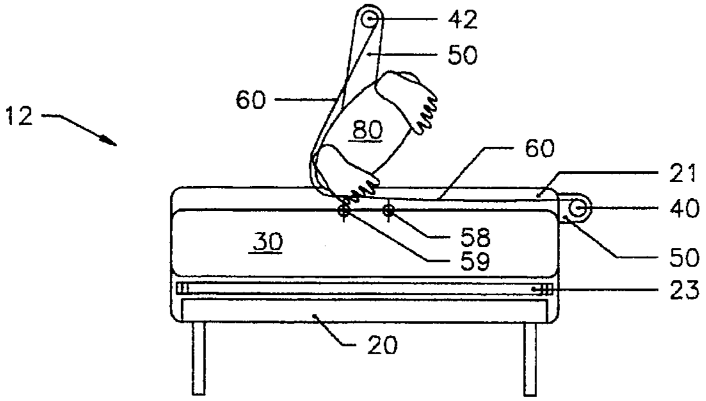
Figure 8:
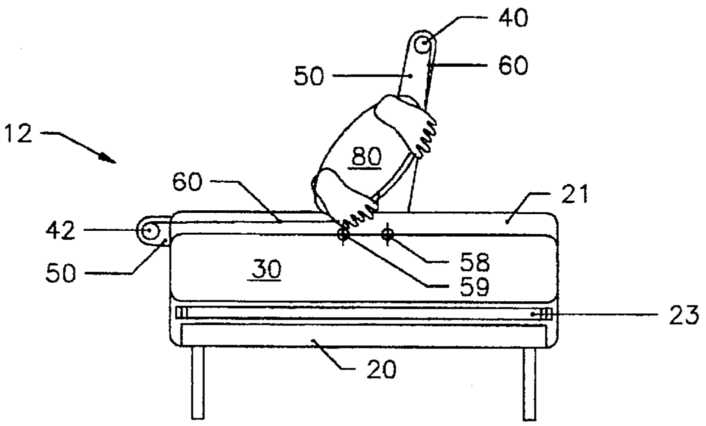
Figure 9:
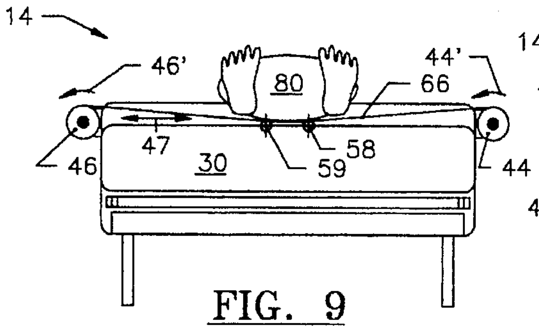
Figure 10:
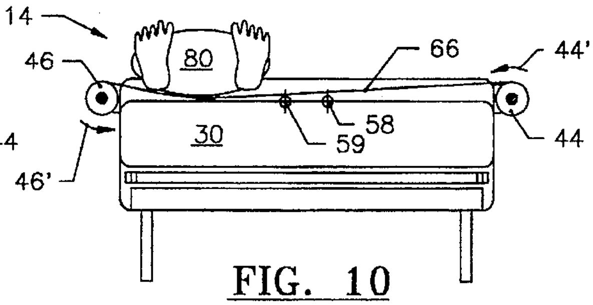
Figure 11:
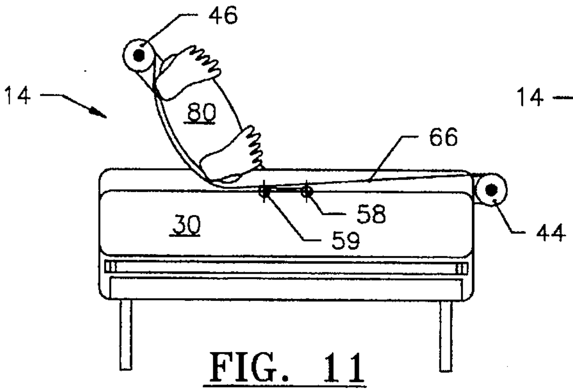
Figure 12:
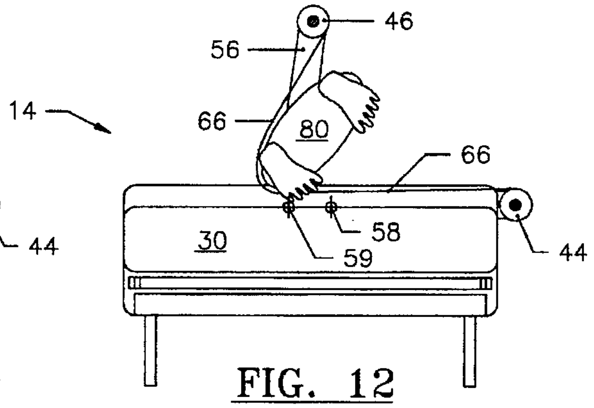
Figure 13:
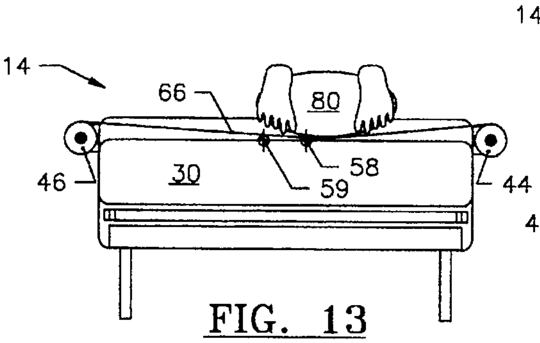
Figure 14:
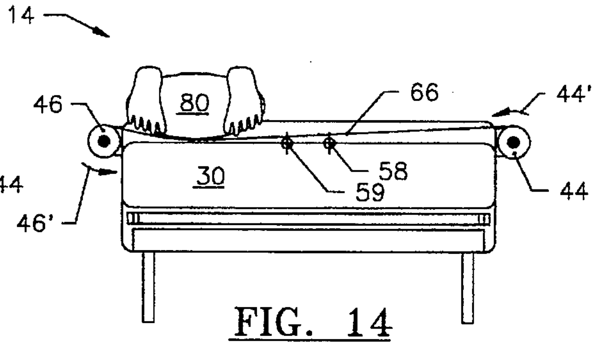
Figure 15:
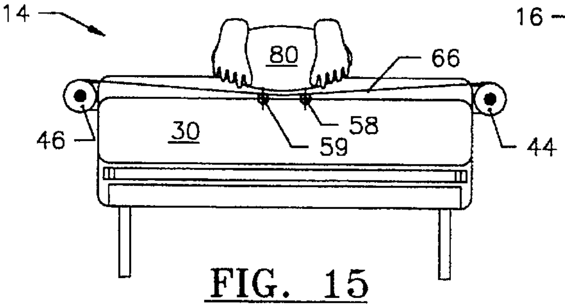

FIG. 9 thru FIG. 15, the second embodiment, are end elevation views of the device of FIG. 3 and FIG. 4 with the foot board and mechanical equipment not shown.

Figure 16:
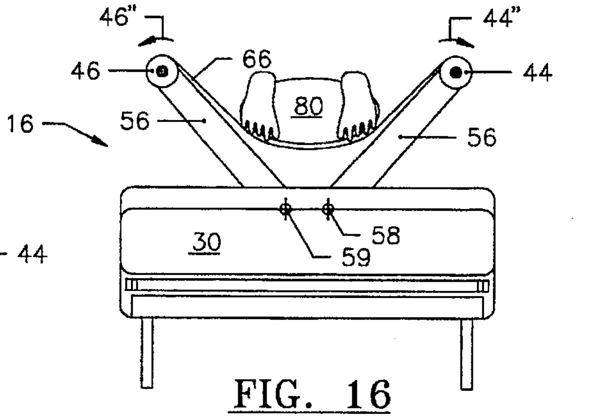

FIG. 16 is a view similar to the previous view but of a third embodiment.

Figure 17:
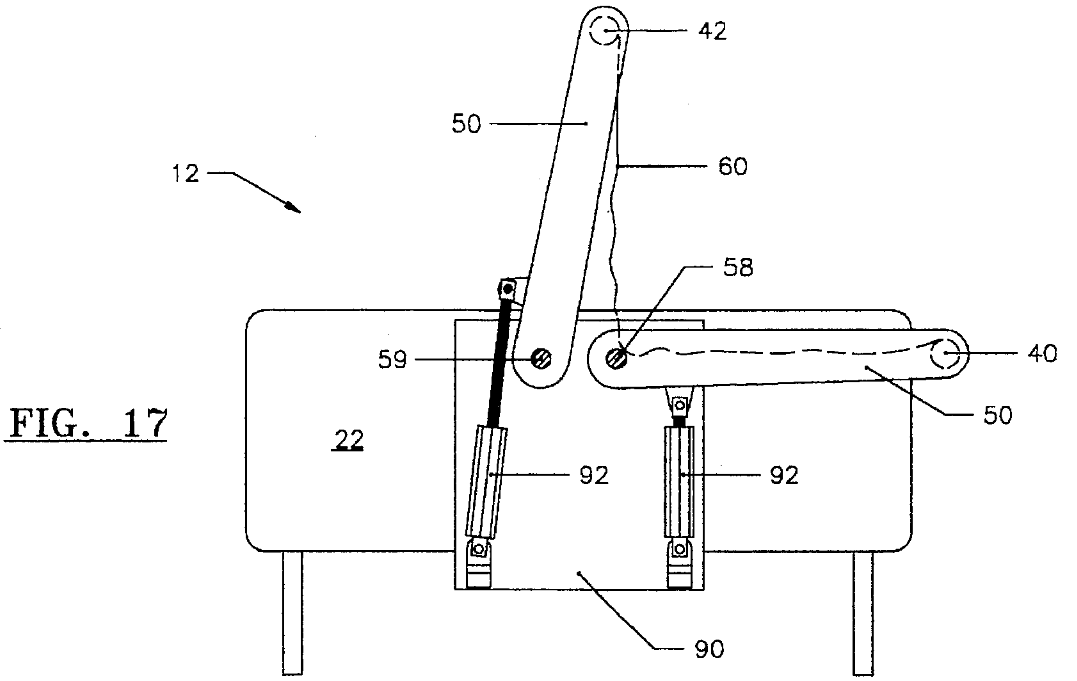

FIG. 17 is an end elevation view of the device of FIG. 1 and 2.

Figure 18:
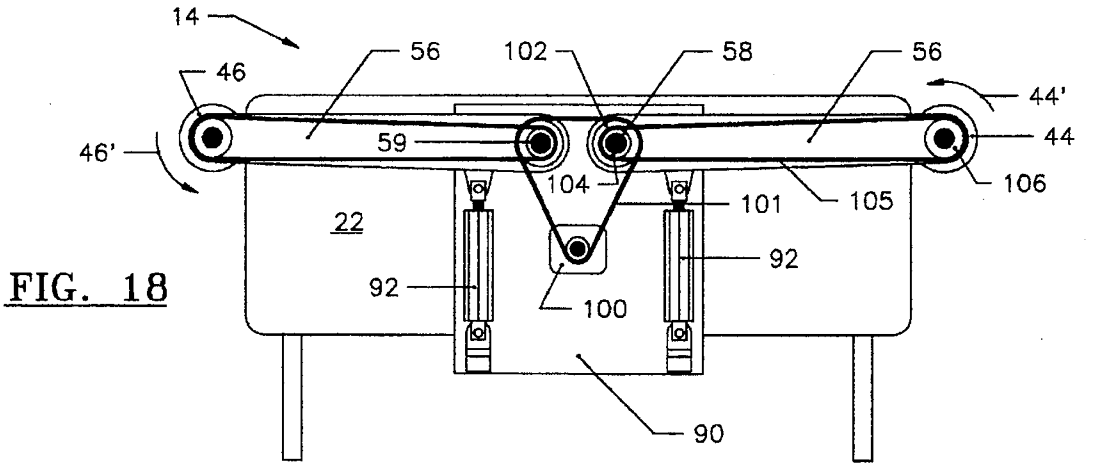

FIG. 18 is an end elevation view of the device of FIG. 3 and 4.

Figure 19:
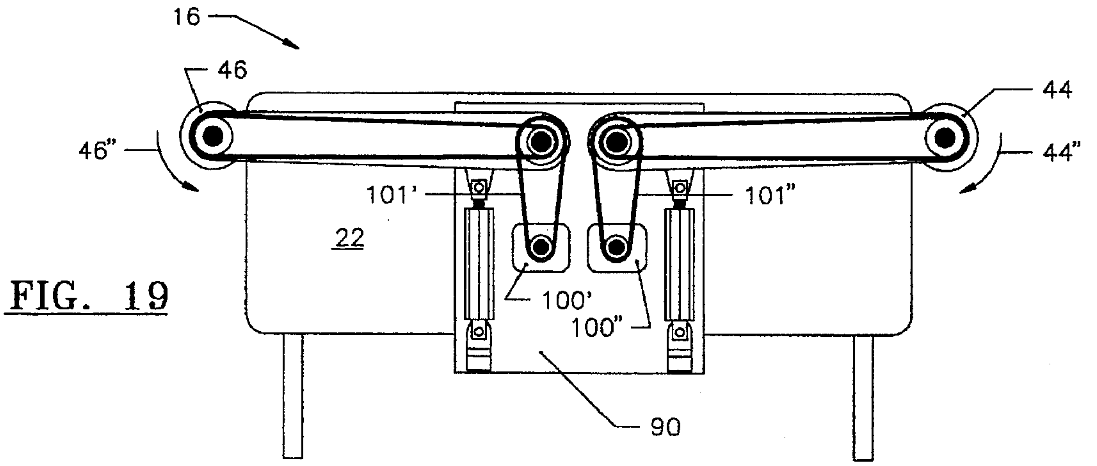

FIG. 19 is an end elevation view of the device of FIG. 16.

Figure 20:
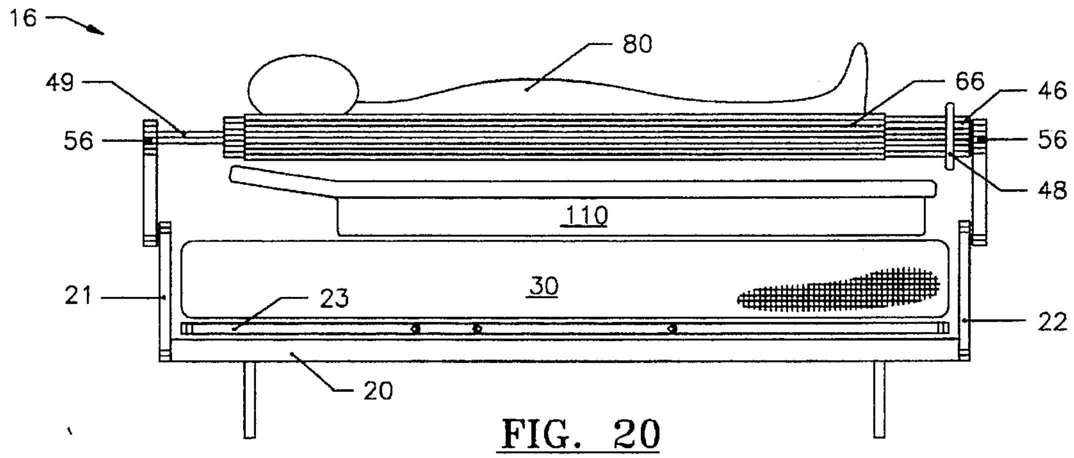

FIG. 20 is a side elevation view of the device of FIG. 16.

Figure 21:
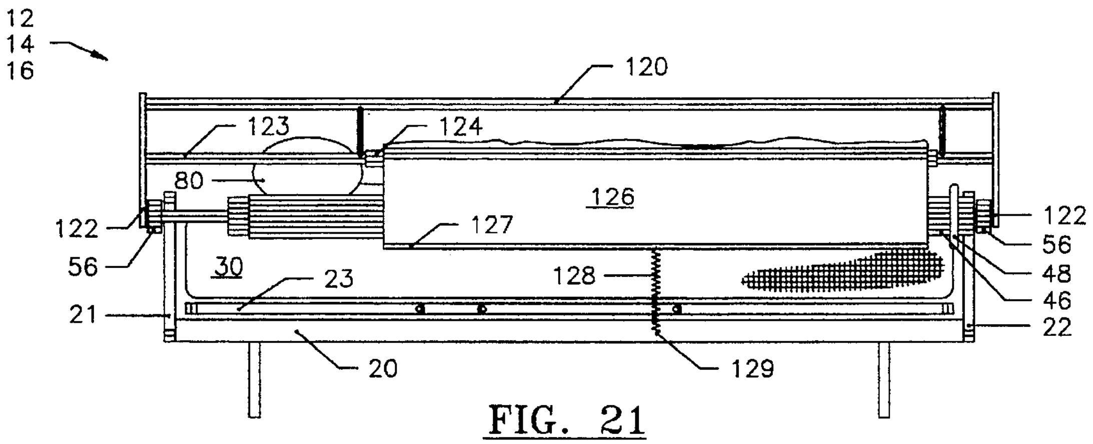

FIG. 21 is a side elevation view of the device of the previous Figures showing a handrail and a top sheet/blanket managing system.

Figure 22:
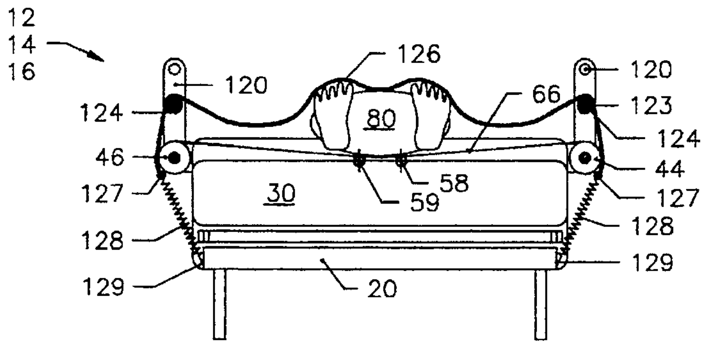
Figure 23:
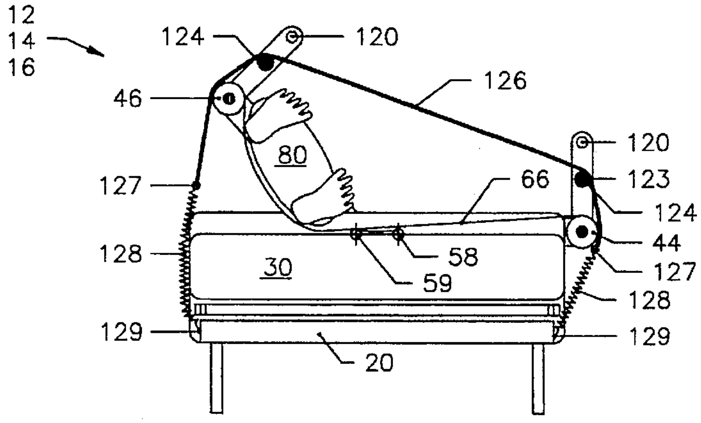

FIG. 22 and 23 are end elevation views of the device of FIG. 21.

Figure 24:
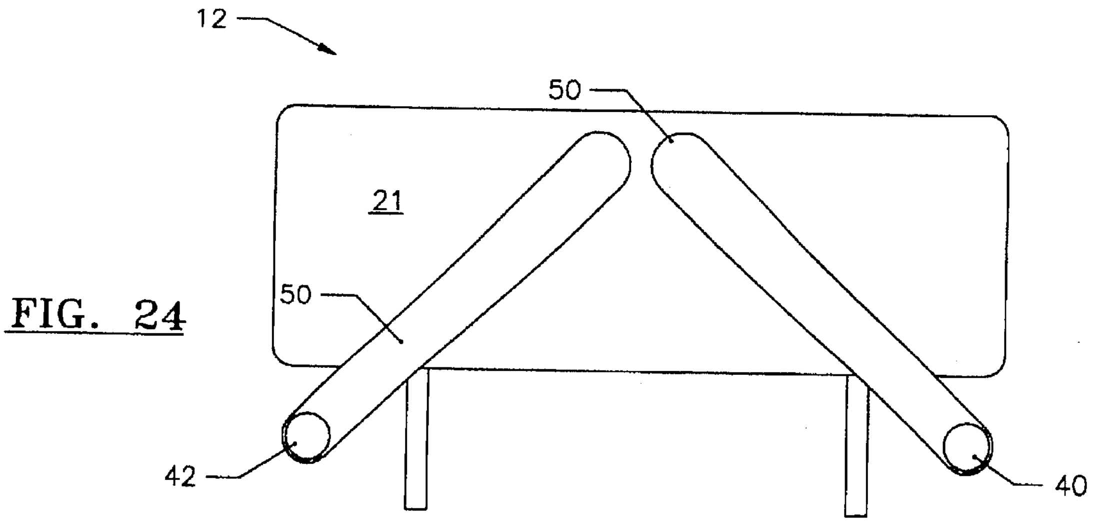
Figure 25:
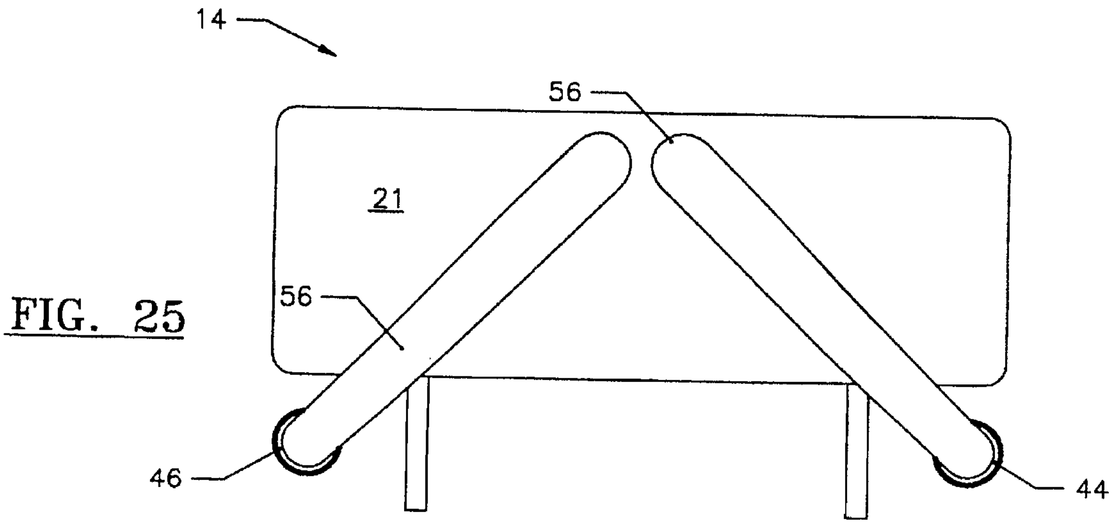

FIG. 24 and 25 are end elevation views of the devices of FIGS. 17, 18 and 19 showing the articulating arms pivoted below a horizontal position.

REFERENCE NUMERALS IN DRAWINGS

12–16 embodiments
20–26 bed
30–34 mattress
40–49 booms, drive rollers
50–59 articulating arms
60–69 transfer/turning sheet
70 control means
80 patient
90–92 pivoting means
100–106 drive means
110 bath tub
120–129 top sheet/blanket manager

DESCRIPTION OF THE PREFERRED EMBODIMENTS

A first embodiment 12 of the present invention is illustrated in its most basic configuration in FIG. 1 and FIG. 2. Bed frame 20 has head board 21 at the head end of the bed and foot board 22 at the foot end. Articulating platform 23 is a standard part on all adjustable beds and is not necessarily required in the present invention. 24 indicates the left side edge of the bed and 26 the right side edge. Centerline 28 is an imaginary reference line running from the middle of the head end to the middle of the foot end and near the top surface of mattress 30. 32 is the first side edge of mattress 30 and 34 is the second side edge. On each side of the bed is a boom 40, 42 to which a turning sheet 60 is attached. Boom 40 is shown on the left side of the bed and boom 42 on the right side. The first or left side edge of the turning sheet 62 is removably attached to boom 40 and the second or right side edge of the turning sheet 64 is removably attached to boom 42. The removable attaching means can be hook and loop fasteners. The free ends 52 of articulating arms 50 connect to the ends of booms 40 and 42. The pivoting ends 54 of articulating arms 50 are pivotly mounted to the bed frame 20 at axis 58 and 59. Axis 58 and 59 are offset several inches on each side of centerline 28. This allows articulating arms 50 to pivot vertically without hitting each other. Pendant 70 controls the various functions of the bed. It may also be a PLC (programmable logic controller) that will integrate and control all of the functions of the bed plus other devices associated with the needs of the patient.

A second embodiment 14 of the present invention is shown in FIG. 3 and FIG. 4. The turning process in this embodiment is identical to that of embodiment 12. In this embodiment powered rotating drive rollers 44, 46, in place of booms 40, 42, provide lateral travel 47 to the transfer/turning sheet 66 allowing for repositioning of the patient after he or she has been turned over. The lower part 67 of the transfer/turning sheet 66 is fluid pervious for bathing purposes as shown in FIG. 20. Hook and loop fasteners 68 attaches sheet 66 to lower part 67. Openings 69 in sheet 66 with fold down flaps in lower part 67 provide for the use of bed pans when a patient is in a raised position as shown in FIG. 20. Articulating arms 56 contain drive means for rotating drive rollers 44 and 46. Travel space 49 on the axles the drive rollers ride allow for them to be moved toward the head of the bed so as to relocate a patient as he or her has slid toward the foot of it. Hand wheels 48 facilitate turning the drive rollers when they are disconnected from the driving means turning them. These makes winding transfer/turning sheet 66 on and off drive rollers 44 and 46 easier.

In FIG. 5 thru FIG. 8 embodiment 12 shows patient 80 being turned over. First the patient is placed on the right side of the bed close to boom 42. Articulating arm 50 pivots on axis 59 raising boom 42 and the right side edge 64 of turning sheet 60. When the articulating arm and boom are more or less vertical the patient will be on his or her side or may have rolled onto a stomach position. That articulating arm and boom is then lowered and the turning sheet lays flat on the mattress again. To turn the patient on his or her back again, FIG. 8, the other articulating arm 50 pivoting on axis 58 with boom 40 and the left side edge 62 of the turning sheet is raised.

FIG. 9 thru FIG. 15 show in embodiment 14 the identical turning process to that of embodiment 12 but with the added feature for transferring or repositioning the patient laterally on the bed. Turning sheet 60 becomes transfer/turning sheet 66. The rotation of the drive rollers is indicated by 44' and 46'. These drive rollers must rotate in unison. While one is rotating clockwise the other must also rotate clockwise. The series of Figures show how the patient is turned over and also transferred to several locations on the bed.

FIG. 16 shows in a third embodiment 16 the rotation of the drive rollers as 44" and 46". By raising both articulating arms 56 and rotating drive roller 44 and drive roller 46 in opposite directions transfer/turning sheet 66 and patient 80 can be lifted and lowered.

FIG. 17 shows the pivoting means in embodiment 12. Hydraulic cylinders 92 pivotly connect to both the bed structure 90 and articulating arms 50. Pneumatic cylinders or electric actuators could be used in place of hydraulic cylinders. Bed structure 90 can be the structure in the original fabrication of a bed or it may be a structure for attaching onto an existing bed.

FIG. 18 shows the driving means in embodiment 14. Drive motor 100 pulls belt or chain 101 turning driven sheave 102. Drive sheave 104 pulls belt or chain 105 turning driven sheave 106 which turn drive rollers 44 and 46.

FIG. 19 shows the driving means in embodiment 16. Drive motor 100' pulls belt or chain 101' and drive motor 100" pulls belt or chain 101". This allows for rotation 44" and 46" to be either direction at the same time. FIG. 20 shows another benefit of embodiment 16. By lifting a patient off of the mattress a bath tub 110 or a bed pan can be placed under the patient. The drive means in this embodiment could be located on the articulating arms 56 instead of on the bed structure 90 and could even be placed inline with the drive rollers.

FIG. 21 shows a top sheet and/or blanket managing system that can be used with embodiment 12, 14 or 16. Handrail 120 is pivotly connected 122 to the free ends 52 of articulating arm 50 or 56. Optional freely rotating handrail 124 rotates on axle 123. A top sheet and/or blanket 126 is disposed over patient 80 and handrail 124 and is attached at their side edges to spreader 127. A resilient element 128 such as a spring or elastic cord connects spreader 127 to the bed frame 20 at location 129. FIG. 22 shows an end elevation view of FIG. 21. FIG. 23 shows patient 80 being turned over and resilient element 128 holding top sheet and/or blanket 126 taunt so they do not interfere with the turning process.

FIG. 24 shows articulating arms 50 in a downwardly position allowing for booms 40 and 42 to reside under the edges of the bed when not in use. FIG. 25 shows articulating arms 56 in a downwardly position allowing for drive rollers 44 and 46 to reside under the edges of the bed when not in use.

SUMMARY OF THE INVENTION

Accordingly, the reader will see that the present invention describes a system for turning over and transferring across the bed a bedridden person. Furthermore, the device has additional advantages in that (a) it will pull a "draw sheet" in a manner similar to that a caregiver would use;

(b) it will lift a "draw sheet" and a patient above the bed so that a bath tub or bed pan can be placed between the patient and the mattress;

(c) it is a device that can be operated by the patient in many cases;

(d) it is a device that does not have to be worn by the patient;

(f) it is a device that manages a top sheet and blankets;

(g) it is a device that can be programmed to transfer, lift, turn a patient over, and change the vertical positions of an adjustable bed automatically.

Preferred embodiments and variants have been suggested for this invention. Other modifications may be made, as by adding, combining, deleting, or subdividing components, parts, or steps, while retaining advantages and benefits of the present invention—which is defined in the following claims.

Thus the scope of the invention should be determined by the appended claims and their legal equivalents, rather than by the examples given.

We claim:

1. A bed for turning over a patient comprising:

a mattress, said mattress having a first side edge and a second side edge and to be placed on a bed frame;

a bed frame, said bed frame having side edges, a head end, a foot end, and a centerline, said centerline being a line from approximately the midspan of said head end to approximately the midspan of said foot end and located at an elevation which may range from a few inches above said mattress to a few inches below said mattress;

a first boom and a second boom, said first boom located near said first side edge of said mattress and said second boom located near said second side edge of said mattress, the length of said booms being approximately the length of said bed frame;

articulating arms having a free end and a pivoting end, the ends of said booms connected to said free ends of said articulating arms, said pivoting ends of said articulating arms connected to pivoting means located on or near each end of said centerline;

means for pivoting said articulating arms to a desired angular position over and under said mattress and said side edges;

a turning sheet that underlies the patient, a first side edge of said turning sheet connected to said first boom, a second side edge of said turning sheet connected to said second boom;

control means for actuating said pivoting means, and by actuating said articulating arms connected to said first boom that boom is raised and said patient is turned over in one direction, then by lowering said first boom and by actuating said articulating arms connected to said second boom that boom is raised and said patient is turned over in the other direction.

2. A bed as defined in claim 1 wherein said turning sheet is removably connected to said booms.

3. A bed as defined in claim 1 wherein said first boom is a first powered rotating drive roller and said second boom is a second powered rotating drive roller, said powered rotating drive rollers are rotated by driving means, said first side edge of said turning sheet wraps around and connects to said first powered rotating drive roller and said second side edge of said turning sheet wraps around and connects to said second powered rotating drive roller, when actuated one of said drive rollers winds and pulls said turning sheet while the other drive roller unwinds and releases said turning sheet so said turning sheet can travel across said bed thus repositioning said patient at a desired location on said bed.

4. A bed as defined in claim 3 wherein said powered rotating drive rollers are rotatably disengagable from said driving means thereby allowing said powered rotating drive rollers to rotate freely when desired.

5. A bed as defined in claim 4 wherein each of said powered rotating drive rollers have at least one hand wheel to ease rotating said powered rotating drive rollers when said powered rotating drive rollers are disconnected from said drive means.

6. A bed as defined in claim 1 further including handrails, said handrails pivotally connected to said free ends of said articulating arms.

7. A bed as defined in claim 6 further including freely rotating handrails for a top sheet and/or blanket to travel over.

8. A bed as defined in claim 6 further including a system for managing bed covers during the turning process, said system comprising a restraining means attached to the side edges of said bed covers, one end of said restraining means attaches to the side edges of said bed covers, said bed covers are disposed over said patient and the handrails, the other end of said restraining means attaches to the side edges of said bed frame, as one of said booms is raised to turn over said patient said restraining means causes said bed covers to span between said handrails and downwardly toward said bed frame thus allowing said patient to be turned over without becoming entangled in said bed covers.

9. A bed as defined in claim 8 wherein said restraining means comprises an elastic element which allows said bed covers to move as required while still restraining their side edges when said booms are raised during said turning process.

10. A bed as defined in claim 1 wherein said control means comprises a programmable logic controller which integrates controlling the turning of the patient and lifting of the patient.

11. A bed for turning over a patient comprising:

a mattress, said mattress having a first side edge and a second side edge and to be placed on a bed frame;

a bed frame, said bed frame having side edges, a head end, a foot end, and a centerline, said centerline being a line from approximately the midspan of said head end to approximately the midspan of said foot end and located at an elevation which may range from a few inches above said mattress to a few inches below said mattress;

a first powered rotating drive roller and a second powered rotating drive roller, said first powered rotating drive roller located near said first side edge of said mattress and said second powered rotating drive roller located near said second side edge of said mattress, the length of said powered rotating drive rollers being approximately the length of said bed frame;

articulating arms having a free end and a pivoting end, the ends of said booms connected to said free ends of said articulating arms, said pivoting ends of said articulating arms connected to pivoting means located on or near each end of said centerline;

means for pivoting said articulating arms to a desired angular position over and under said mattress and said side edges and means to rotate said powered rotating drive rollers;

a transfer/turning sheet that underlies the patient, a first side edge of said transfer/turning sheet wraps around and connects to said first powered rotating drive roller, a second side edge of said transfer/turning sheet wraps around and connects to said second powered rotating drive roller;

control means for actuating said pivoting means and said powered rotating drive rollers, and by actuating said articulating arms connected to said first powered rotating drive roller that drive roller is raised and said patient is turned over in one direction, then by lowering said first powered rotating drive roller and by actuating said articulating arms connected to said second powered rotating drive roller that drive roller is raised and said patient is turned over in the other direction, by actuating one of said powered rotating drive roller that drive roller winds and pulls said transfer/turning sheet while the other drive roller unwinds and releases said transfer/turning sheet so said transfer/turning sheet can travel across said bed thus repositioning said patient at a desired location on said bed.

12. A bed as defined in claim 11 wherein said transfer/turning sheet has a fluid pervious lower laminate which is removably connected to said powered rotating drive rollers and a upper sheet which is removably connected to said lower laminate.

13. A bed as defined in claim 11 wherein said powered rotating drive rollers are rotatably disengagable from said means to rotate said powered rotating drive rollers thereby allowing said powered rotating drive rollers to rotate freely when desired.

14. A bed as defined in claim 13 wherein each of said powered rotating drive rollers have at least one hand wheel to ease rotating said powered rotating drive rollers when said powered rotating drive rollers are disconnected from said means to rotate said powered rotating drive rollers.

15. A bed as defined in claim 11 further including handrails, said handrails pivotally connected to said free end of said articulating arms.

16. A bed as defined in claim 15 further including freely rotating handrails for bed covers to travel over.

17. A bed as defined in claim 16 further including a system for managing said bed covers during the turning process, said system comprising a restraining means attached to the side edges of said bed covers, one end of said restraining means attaches to said side edges of said bed covers, said bed covers are disposed over said patient and said handrails, the other end of said restraining means attaches to the side edges of said bed frame, as one of said powered rotating drive rollers is raised to turn over said patient said restraining means causes said bed covers to span between said handrails and downwardly toward said bed frame thus allowing said patient to be turned over without becoming entangled in said bed covers.

18. A bed as defined in claim 17 wherein said restraining means comprises an elastic element which allows said bed covers to move as required while still restraining said side edges when said powered rotating drive rollers are raised during said turning process.

19. A bed as defined in claim 11 wherein said means to rotate and control means comprises individual systems for each of said powered rotating drive rollers thereby allowing said drive rollers to rotate in either the same direction or in opposite directions, by raising said powered rotating drive rollers and rotating them in opposite directions said patient can be lifted off the surface of said mattress and by reversing the rotation of said drive rollers said patient can be placed on said mattress again.

20. A bed as defined in claim 19 wherein said control means comprises a programmable logic controller which integrates controlling the repositioning the patient, and turning of the patient, lifting of the patient.

* * * * *